United States Patent
Suenaga

(10) Patent No.: US 9,223,333 B2
(45) Date of Patent: Dec. 29, 2015

(54) POWER SUPPLY APPARATUS, ELECTRONIC APPARATUS, AND POWER SUPPLY CONTROL METHOD

(71) Applicant: CASIO COMPUTER CO., LTD., Tokyo (JP)

(72) Inventor: Takashi Suenaga, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 276 days.

(21) Appl. No.: 13/943,569

(22) Filed: Jul. 16, 2013

(65) Prior Publication Data

US 2014/0021882 A1    Jan. 23, 2014

(30) Foreign Application Priority Data

Jul. 20, 2012   (JP) ................................. 2012-161801

(51) Int. Cl.
*H05B 37/02*   (2006.01)
*G05F 3/08*   (2006.01)
*H05B 33/08*   (2006.01)

(52) U.S. Cl.
CPC .............. *G05F 3/08* (2013.01); *H05B 33/0815* (2013.01); *H05B 33/0827* (2013.01); *Y02B 20/346* (2013.01); *Y10T 307/25* (2015.04)

(58) Field of Classification Search
None
See application file for complete search history.

(56) References Cited

U.S. PATENT DOCUMENTS

| | | | |
|---|---|---|---|
| 7,471,051 B1 * | 12/2008 | Wacknov et al. | 315/291 |
| 8,901,847 B2 * | 12/2014 | Suzuki | 315/291 |
| 2010/0188443 A1 * | 7/2010 | Lewis et al. | 345/691 |

FOREIGN PATENT DOCUMENTS

JP      2008-234842 A    10/2008

* cited by examiner

*Primary Examiner* — Cassandra Cox
(74) *Attorney, Agent, or Firm* — Holtz, Holtz, Goodman & Chick PC

(57) ABSTRACT

A power supply apparatus includes a first constant-power power supply that switches and supplies powers of j types (where j is a natural number of two or more), a second constant-power power supply that switches and supplies powers of k types (where k is a natural number of two or more), and a switching controller that selects and switches on the first and second variable-power power supplies, excluding power transition periods thereof, to supply a load with a constant power.

15 Claims, 6 Drawing Sheets

POWER SUPPLY APPARATUS, ELECTRONIC APPARATUS, AND POWER SUPPLY CONTROL METHOD

CROSS-REFERENCE TO RELATED APPLICATIONS

This application is based upon and claims the benefit of priority from prior Japanese Patent Application No. 2012-161801, filed Jul. 20, 2012, the entire contents of which are incorporated herein by reference.

BACKGROUND OF THE INVENTION

1. Field of the Invention

The invention relates to a power supply apparatus, an electronic apparatus, and a power-supply control method, which are particularly suitable for an electronic apparatus, such as a digital light processing (DLP [registered trademark]) projector.

2. Description of the Related Art

Since a large number of electronic apparatuses including various computers require a plurality of stable direct-current voltages from a power supply, DC/DC converters need to be comprised in correspondence with the number of required direct-current voltages.

On the other side, a technology for reducing the number of DC/DC converters is considered (for example, see Jpn. Pat. Appln. KOKAI Publication No. 2008-234842).

Jpn. Pat. Appln. KOKAI Publication No. 2008-234842 discloses a technology configured to provide a light control unit including:

a light source comprising a light emitting part which emits red light, a light emitting part which emits green light, and a light emitting part which emits blue light;

a switching unit connected in series with at least one of solid-state light sources of the light emitting parts;

a variable constant-voltage power supply which is connected in common to the solid-state light sources and drives the light source; and a switching control unit which switches on/off the switching unit.

When the technology described in the Jpn. Pat. Appln. KOKAI Publication No. 2008-234842 is applied to an apparatus which requires a power supply whose voltage sequentially varies in time series, a voltage value is instable during a period in which the voltage value shifts at the time of switching voltages.

Therefore, in some cases, a load circuit in a following stage cannot be made to perform a desired operation and, for example, control of temporarily stopping the load circuit is required.

Under the circumstances, it is desired to provide a power supply, an electronic apparatus, and a power-supply control method, which are capable of supplying a plurality of rated powers (constant powers) switched at a high speed.

BRIEF SUMMARY OF THE INVENTION

According to one aspect of the present invention, there is provided a power supply apparatus comprising: a first constant-power power supply that switches and supplies powers of j types (where j is a natural number of two or more); a second constant-power power supply that switches and supplies powers of k types (where k is a natural number of two or more); and a switching controller that selects and switches on the first and second variable-power power supplies, excluding power transition periods thereof, to supply a load with a constant power.

According to another aspect of the present invention, there is provided a power supply apparatus that supplies powers to first through third loads having respectively different driving powers, comprising: a first variable constant-power power supply that cyclically switches and outputs a first constant power for the first load, a second constant power for the second load, and a third constant power for the third load through transition periods among the constant powers; a second variable constant-power power supply that outputs the third constant power, including the transition period from the first constant power to the second constant power of the first variable constant-power power supply, the first constant power, including the transition period from the second constant power to the third constant power of the first variable constant-power power supply, and the second constant power, including the transition period from the third constant power to the first constant power of the first variable constant-power power supply, with the constant powers cyclically switched through the transition periods among the constant powers; and a switching controller that switches outputs of the first and second variable constant-power power supplies such that the first load is supplied with the first constant powers which do not include the transition periods, alternately from the first and second variable constant-power power supplies, respectively, the second load is supplied with the second constant powers which do not include the transition periods, alternately from the first and second variable constant-power power supplies, respectively, and the third load is supplied with the third constant powers which do not include the transition periods, alternately from the first and second variable constant-power power supplies, respectively.

According to still another aspect of the present invention, there is provided an electronic apparatus comprising: a power supply unit including: a first constant-power power supply that switches and supplies powers of j types (where j is a natural number of two or more), a second variable constant-power power supply that switches and supplies powers of k types (where k is a natural number of two or more), and a switching controller that selects and switches the first and second variable constant-power power supplies, respectively excluding power transition periods thereof, to supply a constant power; and a load that operates by powers supplied from the power supply unit.

According to still another aspect of the present invention, there is provided an electronic apparatus with a power supply unit that supplies powers to a first through third loads having respectively different driving powers, the power supply unit comprising: a first variable constant-power power supply that cyclically switches and outputs a first constant power for the first load, a second constant power for the second load, and a third constant power for the third load through transition periods among the constant powers; a second variable constant-power power supply that outputs the third constant power, including the transition period from the first constant power to the second constant power of the first variable constant-power power supply, the first constant power, including the transition period from the second constant power to the third constant power of the first variable constant-power power supply, and the second constant power, including the transition period from the third constant power to the first constant power of the first variable constant-power power supply, with the constant powers cyclically switched through the transition periods among the constant powers; and a switching controller that switches outputs of the first and second variable constant-power power supplies such that the first load is supplied with the first constant powers which do not include the transition periods, alternately from the first and second variable constant-power power supplies, respectively, the second load is supplied with the second constant powers which do not include the transition periods, alternately from the first and second variable constant-power power supplies, respectively, and the third load is supplied with the third constant powers which do not include the transition periods, alternately from the first and second variable constant-power power supplies, respectively.

According to still another aspect of the present invention, there is provided a power supply method comprising allowing a first constant-power power supply to switch and supply powers of j types (where j is a natural number of two or more); allowing a second constant-power power supply to switch and supply powers of k types (where k is a natural number of two or more); and selecting and switching on the first and second variable-power power supplies, excluding power transition periods thereof, to supply a load with a constant power.

According to still another aspect of the present invention, there is provided a power supply control method for an apparatus with a power supply unit that supplies powers to first through third loads having respectively different driving powers, the method comprising: allowing a first variable constant-power power supply to cyclically switch and output a first constant power for the first load, a second constant power for the second load, and a third constant power for the third load through transition periods among the constant powers; allowing a second variable constant-power power supply to output the third constant power, including the transition period from the first constant power to the second constant power of the first variable constant-power power supply, the first constant power, including the transition period from the second constant power to the third constant power of the first variable constant-power power supply, and the second constant power, including the transition period from the third constant power to the first constant power of the first variable constant-power power supply, with the constant powers cyclically switched through the transition periods among the constant powers; and switching outputs of the first and second variable constant-power power supplies such that the first load is supplied with the first constant powers which do not include the transition periods, alternately from the first and second variable constant-power power supplies, respectively, the second load is supplied with the second constant powers which do not include the transition periods, alternately from the first and second variable constant-power power supplies, respectively, and the third load is supplied with the third constant powers which do not include the transition periods, alternately from the first and second variable constant-power power supplies, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

A first embodiment will now be described with reference to the drawings where the invention is applied to a DLP (registered trademark) projector apparatus.

Figure 1:
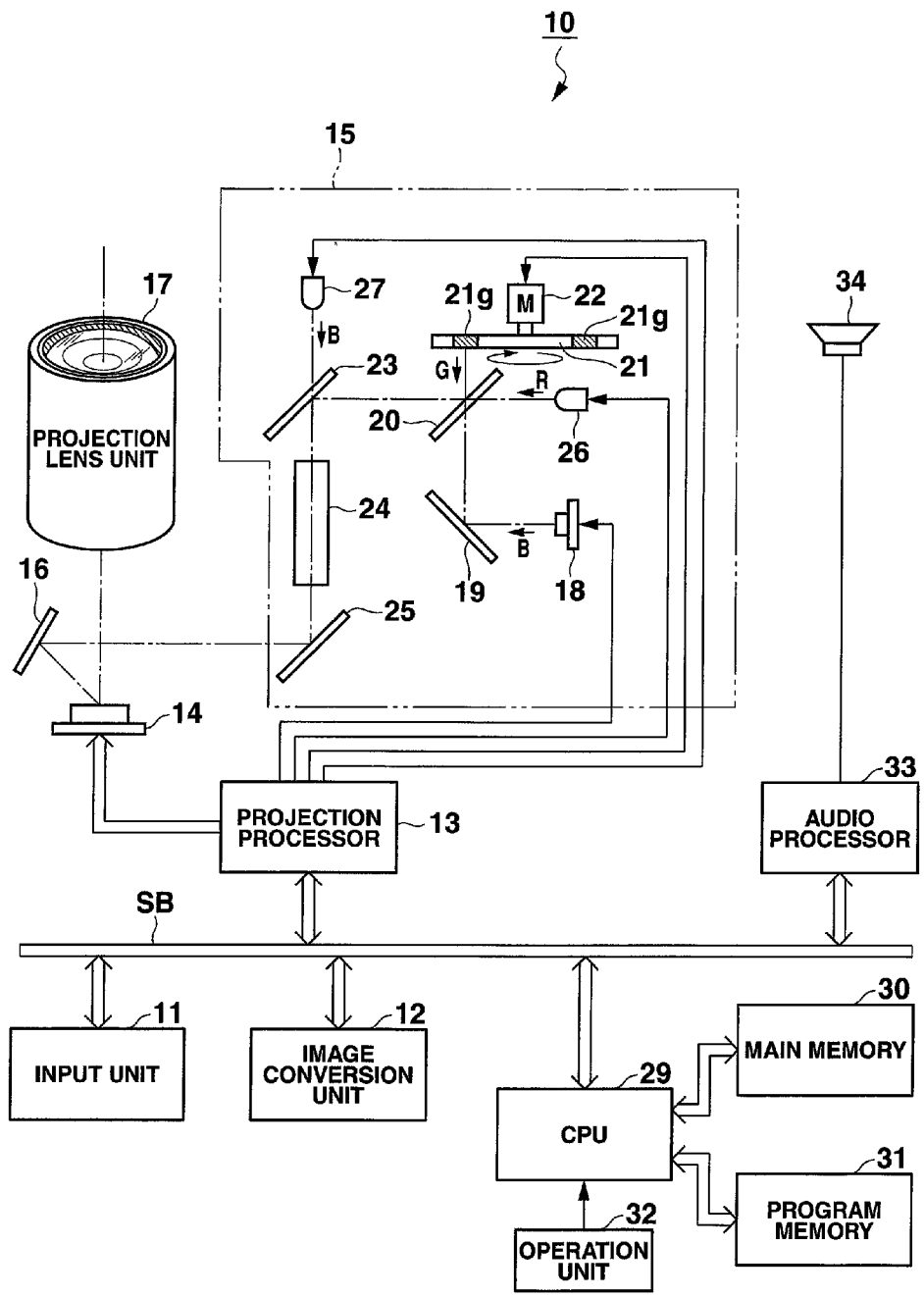
FIG. 1 shows a configuration of an electronic circuit and an optical system in a projector apparatus according to a first embodiment of the invention.

FIG. 1 shows a schematic functional configuration of a projector apparatus 10 according to the first embodiment.

An input unit 11 is configured by, for example, a video input terminal of pin jack (RCA) type, an RGB input terminal of D-sub15 type, and a High-definition Multimedia Interface (HDMI) terminal. Analog or digital image signals input to the input unit 11 according to various standards are digitized, if needed, by the input unit 11, and are then fed to an image converter 12 through a system bus SB.

The image converter 12 is also referred to as a scaler or formatter, performs unification of converting input digital-value image data into image data in a predetermined format which is suitable for projection, and feeds the image data to a projection processor 13.

The projection processor 13 drives a micromirror element 14 as a spatial optical modulator to perform display of higher-speed time-divisional driving in which a frame rate of, for example, 120 frames/second, a number of color components, and a number of display gradations in compliance with the predetermined format are multiplied according to the fed image data.

The micromirror element 14 turns on/off individually at high speed inclination angles of a plurality of micromirrors which are arrayed on a wide extended graphic array (WXGA: 800 pixels by 1280 pixels) to display an image, and forms an optical image by reflection light thereof.

On the other side, light is emitted in primary colors R, G, and B cyclically in a time-sharing manner from the light source unit 15.

Light of the primary colors from the light source unit 15 is totally reflected by a mirror 16 and is irradiated onto the micromirror element 14.

An optical image is formed by the reflection light from the micromirror element 14. The formed optical image is projected and displayed through the lens unit 17 onto an unillustrated screen which is a projection target.

The light source unit 15 includes a semiconductor laser device (LD) 18 which emits blue laser light.

The blue laser light (B) which the LD 18 emits is reflected by the mirror 19 and penetrates a dichroic mirror 20. The light is thereafter irradiated onto a circumferential surface of a fluorescent wheel 21.

This fluorescent wheel 21 is rotated by the wheel motor (M) 22, and a fluorescent layer 21g is formed over the whole annular circumference which is irradiated with the blue laser light.

More specifically, the fluorescent layer 21g is formed by applying a fluorescent material on the circumference which is irradiated with the laser light of the fluorescent wheel 21.

On the back surface opposite to a surface where the fluorescent layers 21g of the fluorescent wheel 21 is formed, an unillustrated reflection plate is provided so as to overlap the fluorescent layer 21g.

When the fluorescent layer 21g of the fluorescent wheel 21 is irradiated with the blue laser light, green light (G) is excited as reflection light.

The green light is reflected by the dichroic mirror 20 and also by a dichroic mirror 23, and is then integrated into light flux having uniform luminance distribution by the integrator 24. The light flux is then reflected by a mirror 25 and reaches the mirror 16.

Further, the light source unit 15 includes a light emitting diode (LED) 26 which emits red light, and a LED 27 which emits blue light.

The red light (R) emitted by LED 26 penetrates the dichroic mirror 20 and is reflected by the dichroic mirror 23, and is then integrated into light flux having uniform luminance distribution by the integrator 24. The light flux is then reflected by the mirror 25, and reaches the mirror 16.

The blue light (B) emitted by LED 27 penetrates the dichroic mirror 23, and is integrated into light flux having uniform luminance distribution by the integrator 24. The light flux is then reflected by the mirror 25, and reaches the mirror 16.

As described above, the dichroic mirror 20 allows blue light and red light to penetrate while the dichroic mirror 20 reflects green light.

The dichroic mirror 23 allows blue light to penetrate while the dichroic mirror 23 reflects green light and red light.

Under control of a CPU 29 described later, the projection processor 13 performs formation of an optical image by display of an image by the micromirror element 14, light emission of each of the LD 18, and LEDs 26 and 27, and rotation of the fluorescent wheel 21 by the wheel motor 22.

The CPU 29 controls all operations of the respective circuits described above.

The CPU 29 is directly connected to a main memory 30 and a program memory 31.

The main memory 30 is configured by, for example, an SRAM and functions as a work memory for the CPU 29.

The program memory 31 is configured by an electrically rewritable nonvolatile memory, and stores operation programs and data of various fixed forms to be performed by the CPU 29.

The CPU 29 performs control operation in the projector apparatus 10 by using the main memory 30 and the program memory 31.

The CPU 29 performs a variety of projection operations in accordance with key operation signals from an operation unit 32.

The operation unit 32 includes a key operation unit provided on a body of the projector apparatus 10, and an infrared-light receiving unit which receives infrared light from an unillustrated remote controller specialized for the projector apparatus 10. The operation unit 32 outputs, directly to the CPU 29, key operation signals based on keys which are operated by the key operation unit of the body or by a remote controller of the projector apparatus 10.

The CPU 29 is connected also to an audio processor 33 through the system bus SB.

The audio processor 33 includes a sound source circuit, such as a PCM tone generator, and converts audio data supplied through the system bus SB during a projection operation into analog data. The audio processor 33 enhances and outputs the data through a loudspeaker unit 34 or generates a beep sound if needed.

Next with reference to FIG. 2, a specific example of a configuration of an optical system will be described including the light source unit 15, micromirror element 14, and projection lens unit 17.

Figure 2:
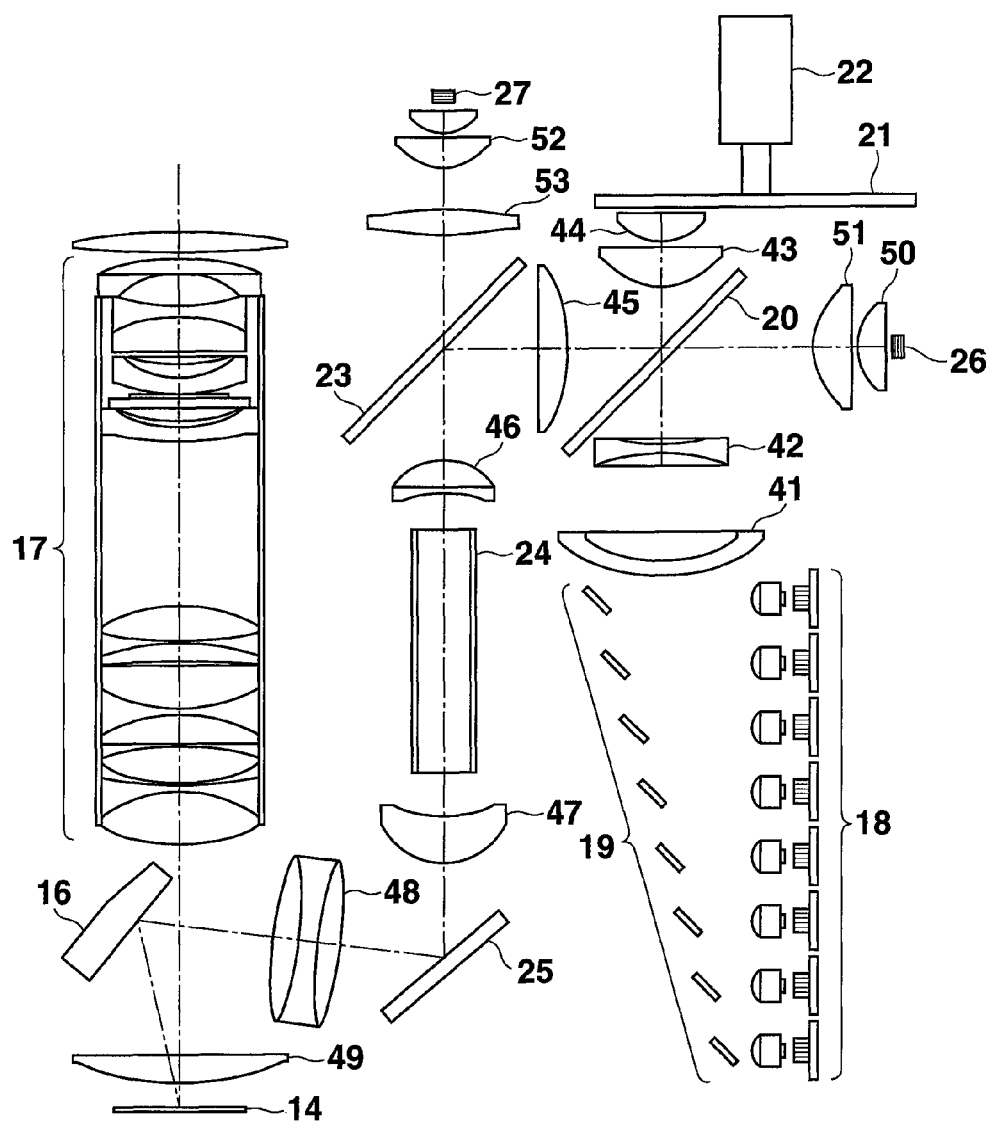
FIG. 2 shows a specific example of a configuration of the optical system according to the first embodiment.

In FIG. 2, the LD 18 is configured as an LD array in which a plurality of devices, for example, a total 24 of 8×4 devices (directions vertical to the surface of the figure), are arranged on a matrix.

Blue laser light emitted from each of the devices is reflected by a mirror 19 which is configured by a mirror array where eight mirrors are arranged in steps and are each shaped like a strip.

The blue laser light reflected by the mirror 19 is projected onto the fluorescent wheel 21 through lenses 41 and 42, the dichroic mirror 20, and lenses 43 and 44.

The green light excited by the fluorescent layer 21g (see FIG. 1) of the fluorescent wheel 21 is reflected by an unillustrated reflection plate which is provided on the back surface opposite to a surface where the fluorescent layer 21g of the fluorescent wheel 21 is formed. The green light is then reflected by the dichroic mirror 20 through lenses 44 and 43, penetrates lens 45, and is then reflected by the dichroic mirror 23.

The green light reflected by the dichroic mirror wheel 23 is further reflected by the mirror 25 through lens 46, integrator 24, and lens 47, and reaches the mirror 16 further through lens 48.

The green light reflected by the mirror 16 is irradiated onto the micromirror element 14 through lens 49, and an optical image of a corresponding color is formed by the micromirror element 14.

The formed optical image is emitted to the side of the projection lens unit 17 through lens 49.

The red light emitted by LED 26 penetrates the dichroic mirror 20 through lenses 50 and 51, and is reflected by the dichroic mirror 23 through lens 45.

The blue light emitted by LED 27 penetrates the dichroic mirror 23 through lenses 52 and 53.

Next, a specific circuit configuration of a drive circuit for the LD 18, LED 26, and LED 27 which form the light emitting device will be described referring to FIG. 3.

For example, a predetermined voltage, for example, a direct-current voltage of 5.5 V, is applied to each of a first DC/DC converter 62 and a second DC/DC converter 63 from a direct-current power supply 61 which is configured by an AC/DC converter.

Both the first DC/DC converter 62 and the second DC/DC converter 63 are variable constant-voltage power supplies, and generate a voltage Vg for driving the LD 18, a voltage Vr for driving LED 26, and a voltage Vb for driving LED 27, based on control signals from a power controller (voltage/current controller) 64A in a power supply controller 64 described later.

The voltage which the first DC/DC converter 62 generates is applied to an anode of LED 26 through an FET switch SW1R, an anode of the LD 18 through an FET switch SW1G, and an anode of LED 27 through an FET switch SW1B.

Each of the cathodes of LED 26, LD 18, and LED 27 is grounded.

Similarly, the voltage which the second DC/DC converter 63 generates is applied to the anode of LED 26 through an FET switch SW2R, the anode of the LD 18 through an FET switch SW2G, and the anode of LED 27 through an FET switch SW2B.

Further, a gate signal for on/off control is supplied from a switching controller 64B of the power supply controller 64 to a gate terminal of each of FET switches SW1R, SW1G, SW1B, SW2R, SW2G, and SW2B.

The power supply controller 64 includes the power controller 64A and the switching controller 64B.

The power controller 64A controls voltages which are respectively generated by the first DC/DC converter 62 and the second DC/DC converter 63, shifting timings and current values thereof.

The switching controller 64B selectively controls light emission timings and supplied powers of the respective light emitting devices by switching on/off FET switches SW1R, SW1G, SW1B, SW2R, SW2G, and SW2B, by signals supplied to the respective gate terminals of these switches.

The power supply controller 64 is provided in the projection processor 13 in FIG. 1, and causes the power controller 64A and the switching controller 64B to perform light emission driving of LED 26, LD 18, and LED 27, based on control instructions from the CPU 29.

An operation of the circuit configuration as described above will now be described below.

Figure 3:
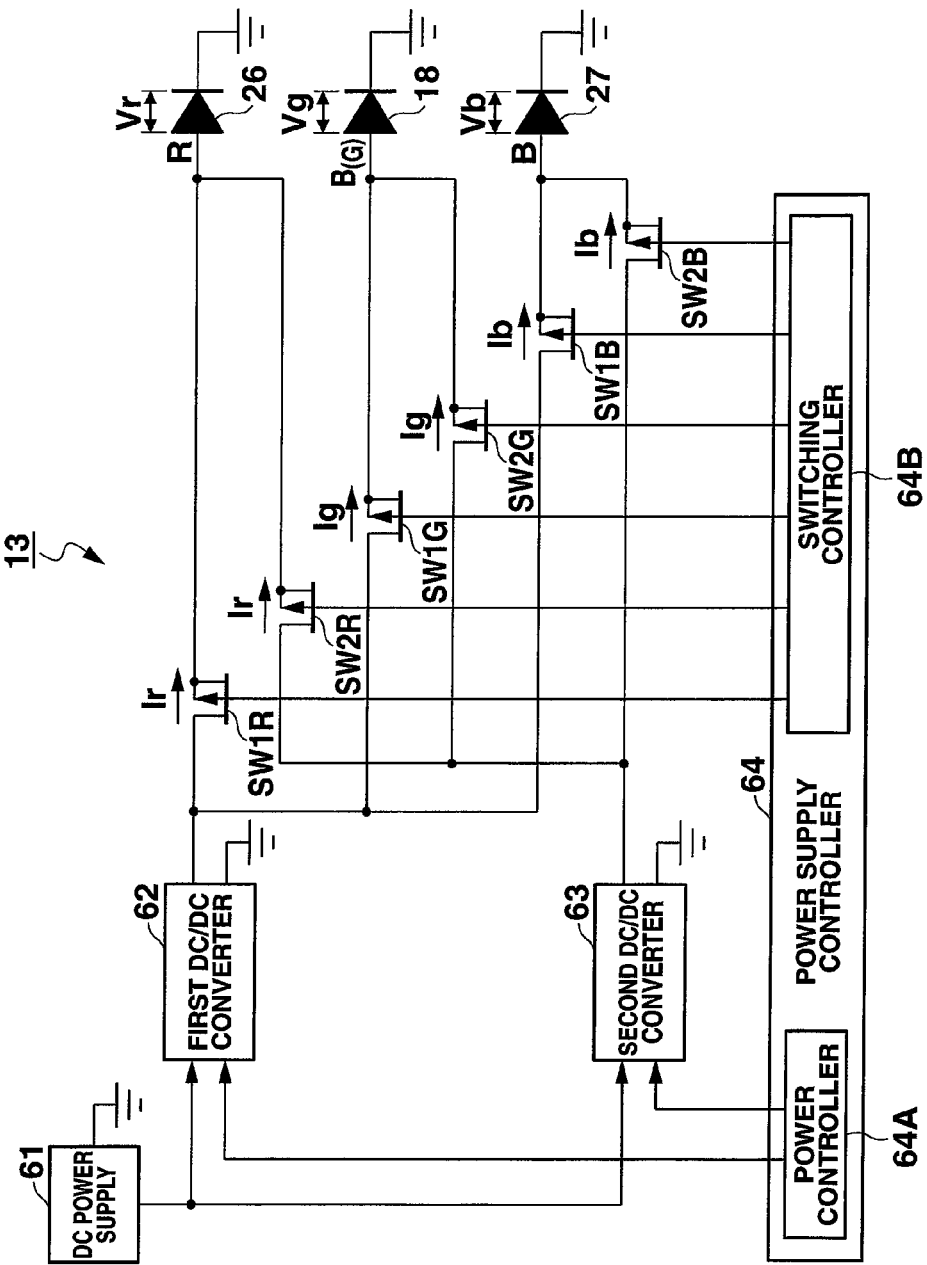
FIG. 3 shows a configuration of connections of a semiconductor light-emitting device and a power supply system according to the first embodiment.
Figure 4:
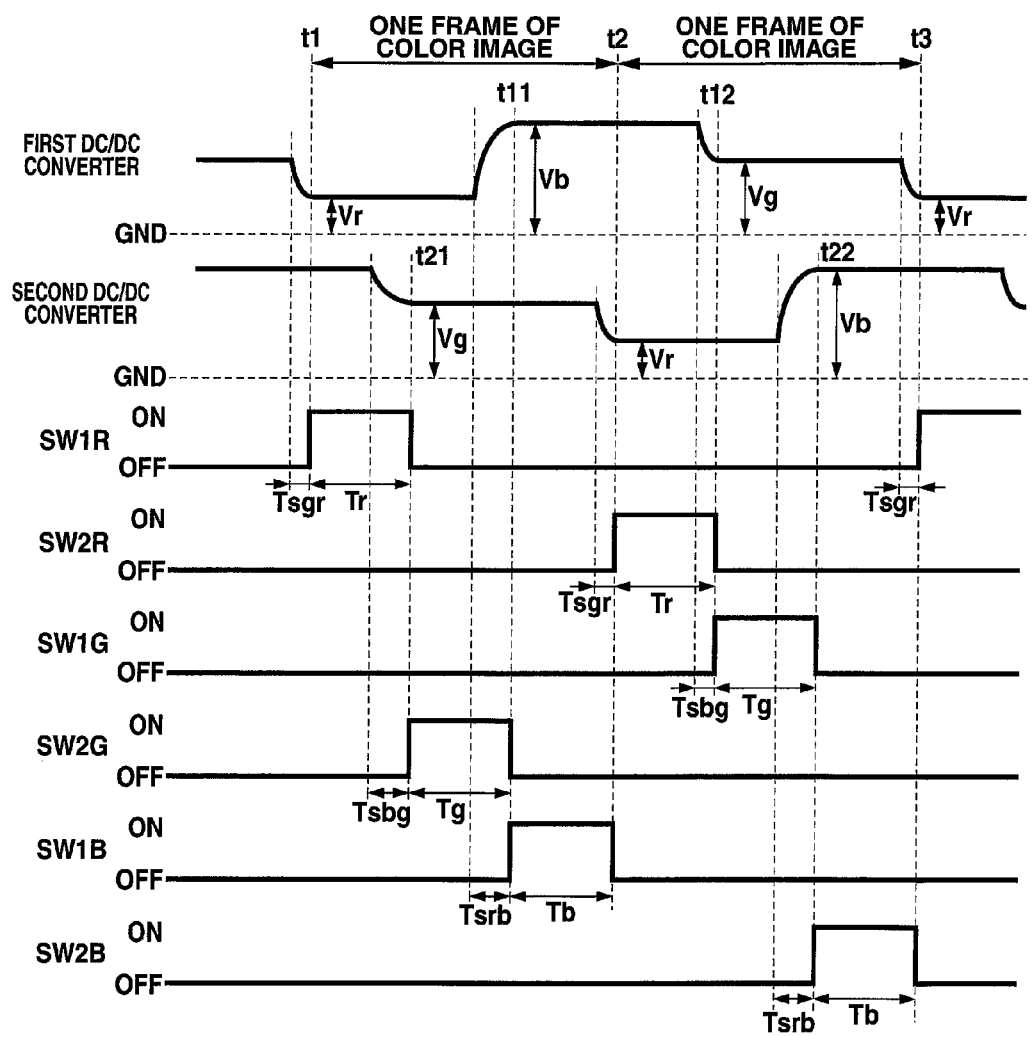
FIG. 4 is a timing chart showing states of shifting of electric powers supplied to the semiconductor light-emitting device according to the first embodiment.

FIG. 4 is a timing chart which shows voltage waveforms at several points on the circuit configuration shown in FIG. 3.

The operation will be described with reference to an example in which voltage Vg for driving the LD 18 foregoing drive, voltage Vr for driving LED 26, and voltage Vb for driving LED 27 satisfy a relation such that Vr<Vg<Vb.

In the first embodiment, one frame of a color image to project is supposed to comprise three fields, i.e., a red image (R) field, a green image (G) field, and a blue image (B) field. Light of primary colors is supposed to be emitted by repeatedly performing, on the side of the light source, a similar pattern of driving for each unit which includes a total of two frames, i.e., one frame from time t1 to time t2 and one frame from time t2 to time t3 as shown in the drawings (hereinafter referred to as a first frame and a second frame).

As indicated by the waveform of the first DC/DC converter in FIG. 4, the power controller 64A controls switching so as to sequentially output constant voltages Vr, Vb, and Vg sequentially to the first DC/DC converter 62 during two frames from time t1 to time t3.

More precisely, supposing that a voltage output from the first DC/DC converter 62 shifts from voltage Vg to voltage Vr and that a transition period required to become able to supply stable voltage Vr is expressed as Tsgr, the power controller 64A instructs the first DC/DC converter 62 to make an output voltage variable (or switch) from Vg to Vr at an earlier timing by transition period Tsgr than time t1.

Alternatively, supposing that the voltage shifts from voltage Vr to voltage Vb and that a transition period required to become able to supply stable voltage Vb is expressed as Tsrb, in synchronization with a field B of the first frame, the power controller 64A instructs the first DC/DC converter 62 to make the output voltage variable (or switch) from Vr to Vb at an earlier timing by transition period Tsrb than time t11 when the field B of the first frame starts.

Still alternatively, supposing that the voltage shifts from voltage Vb to voltage Vg and that a transition period required to become able to supply stable voltage Vg is expressed as Tsbg, in synchronization with a field G of the second frame, the power controller 64A instructs the first DC/DC converter 62 to make an output voltage variable (or switch) from Vb to Vg at an earlier timing by transition period Tsbg than time t12 when the field G of the second frame starts.

Further as indicated by the waveform of the second DC/DC converter in FIG. 4, the power controller 64A controls the second DC/DC converter 63 to switch such that constant voltages Vg, Vr, and Vb are sequentially output in a phase which is delayed from an output pattern of the first DC/DC converter 62 by approximately one field concerning color switching, during two frames from time t1 to time t3.

More precisely, supposing that the voltage output from the second DC/DC converter 63 shifts from voltage Vb to voltage Vg and that a transition period required to become able to supply stable voltage Vg is expressed as Tsbg, the power controller 64A instructs the second DC/DC converter 63 to make the output voltage variable (or switch) from Vg to Vr at an earlier timing by transition period Tsbg than time t21 when the field G of the first frame starts.

Alternatively, supposing that the voltage shifts from voltage Vg to voltage Vr and that a transition period required to become able to supply stable voltage Vr is expressed as Tsgr, in synchronization with a field R of the second frame, the power controller 64A instructs the second DC/DC converter 63 to make the output voltage variable (or switch) from Vg to Vr at an earlier timing by transition period Tsgr than time t2 when the second frame starts.

Still alternatively, supposing that the voltage shifts from voltage Vr to voltage Vb and that a transition period required to become able to supply stable voltage Vb is expressed as Tsrb, in synchronization with a field B of the second frame, the power controller 64A instructs the second DC/DC converter 63 to make the output voltage variable (or switch) from Vr to Vb at an earlier timing by transition period Tsrb than time t22 when the field B of the second frame starts.

On the other hand, in the first frame, the switching controller 64B of the power supply controller 64 switches on (or causes to conduct) switch SW1R in synchronization with the field R as indicated by the waveform of SW1R in FIG. 4, switch SW2G in synchronization with the field G as indicated by the waveform of SW2G in FIG. 4, and switch SW1B in synchronization with the B field as indicated by the waveform of SW1B in FIG. 4, continuously without an interval. Accordingly, stable constant voltage Vr which does not include a transition period can be applied to LED 26 during the R field. Constant voltage Vg can be applied to the LD 18 during the G field, as well as constant voltage Vb can be applied to LED 27 during the B fields. So, LED 26, LD 18, and LED 27 each can therefore be made to emit light continuously without an interval with desired stable power.

Similarly, in the second frame, the switching controller 64B switches on (or causes to conduct) switch SW2R in synchronization with the field R as indicated by the waveform of SW2R in FIG. 4, switch SW1G in synchronization with the field G as indicated by the waveform of SW1G in FIG. 4, and switch SW2B in synchronization with the field B as indicated by the waveform of SW2B in FIG. 4, continuously without an interval. Accordingly, LED 26, LD 18, and LED 27 can be operated to emit light with desired stable power without an interval.

Thus, while voltage transition periods of the two DC/DC converters 62 and 63 are controlled so as not to overlap each other, outputs of the converters which are switched alternately are supplied to the side of the light emitting devices. In this manner, three loads 26, 18, and 27 which have respectively different operating voltages are respectively driven sequentially without an interval in a stable state.

(Second Embodiment)

Next, a second embodiment of the invention will be described with reference to the drawings.

Figure 5:
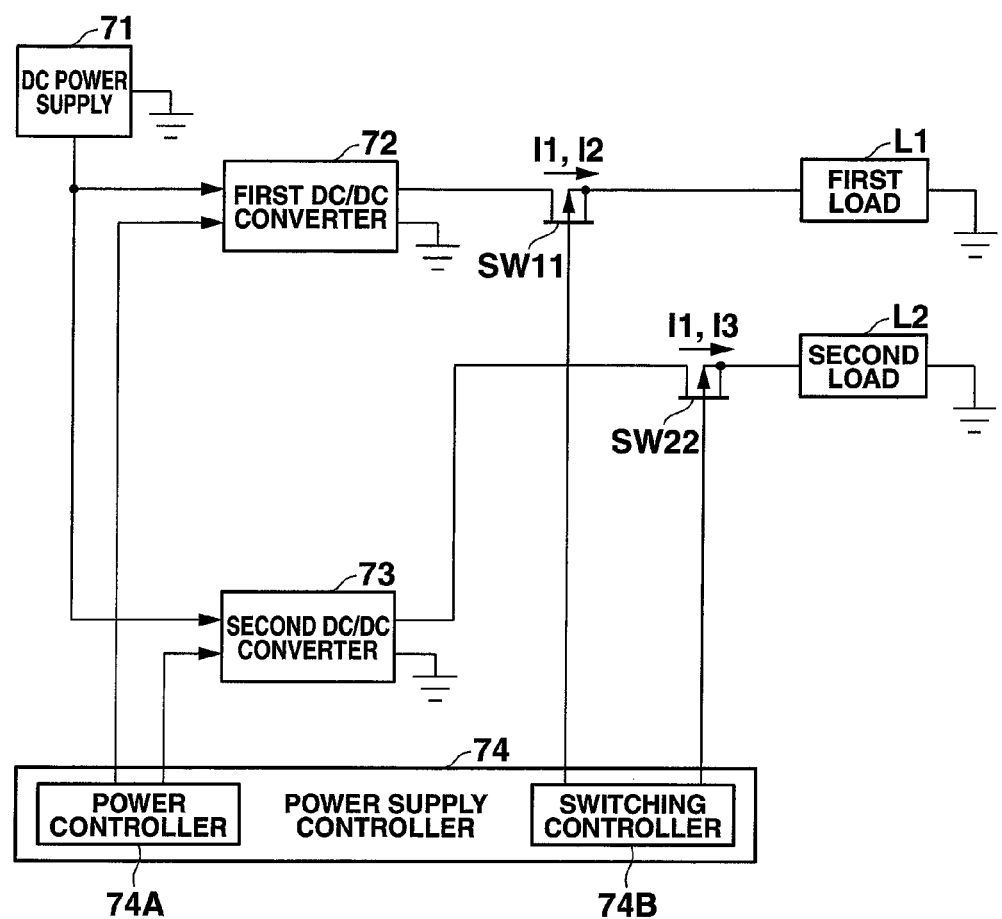
FIG. 5 shows a configuration of connections of loads and a power supply system according to a second embodiment of the invention.

FIG. 5 shows a specific circuit configuration where loads are driven respectively at different voltages.

In FIG. 5, a total of two loads of a first load L1 and a second load L2 are driven respectively at different voltages.

Specifically, the first load L1 is driven at a voltage V1 or V2.

The second load L2 is driven at a voltage V1 or V3.

For example, a predetermined voltage, for example, a direct-current voltage of 5.5 V is applied to each of a first DC/DC converter 72 and a second DC/DC converter 73 from a direct-current (DC) power supply 71 configured by an AC/DC converter.

Both the first DC/DC converter 72 and the second DC/DC converter 73 are variable constant-voltage power supplies, and generate voltages V1, V2, and V3 for driving the first load L1 and the second load L2, based on control signals from a power controller (voltage/current controller) 74A in a power supply controller 74 described later.

The voltages which the first DC/DC converter 72 generates are applied to the first load L1 through an FET switch SW11.

The voltages which the second DC/DC converter 73 generates are applied to the second load L2 through an FET switch SW22.

Further, a gate signal for switching on/off is supplied from a switching controller 74B of the power supply controller 74 to a gate terminal of each of FET switches SW11 and SW22.

The power supply controller 74 includes the power controller 74A and the switching control unit 74B.

The power controller 74A controls voltages, which are respectively generated by the first DC/DC converter 72 and the second DC/DC converter 73, transition timings and current values thereof.

The switching controller 74B selectively controls driving states of the respective loads by switching on/off FET switches SW11R and SW22 by signals which are supplied to the respective gate terminals of these switches.

An operation of the circuit configuration as described above will be described below.

Figure 6:
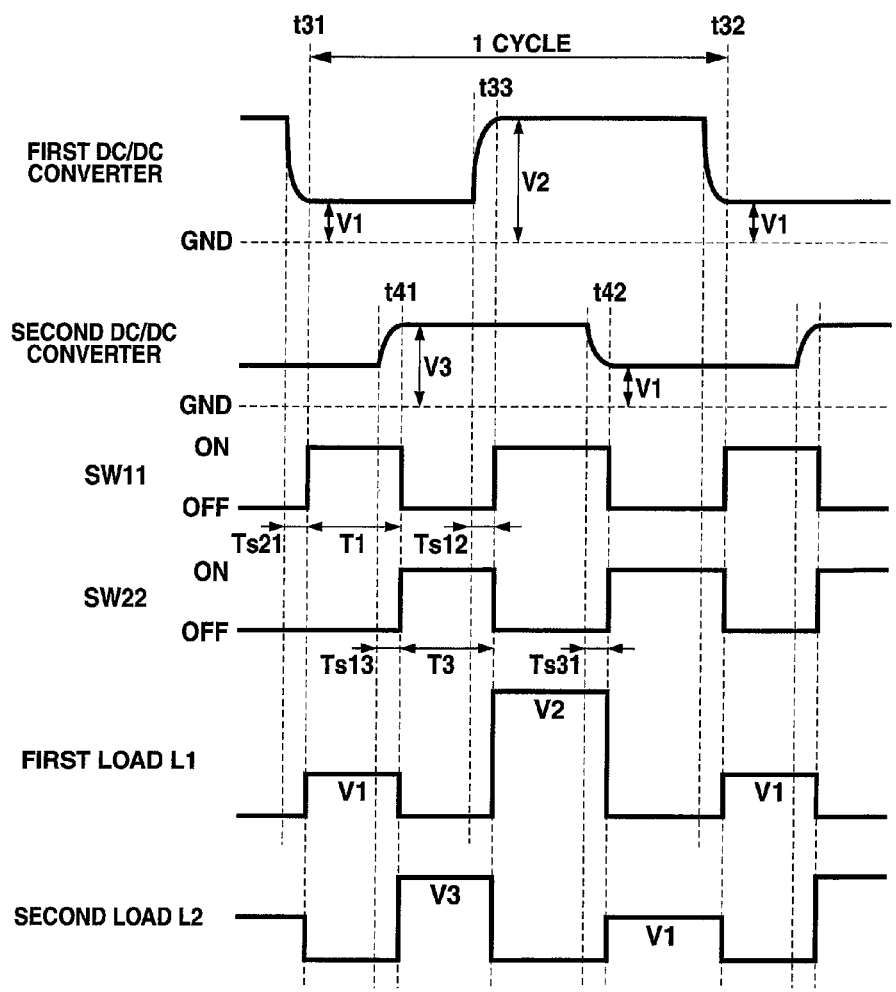
FIG. 6 is a timing chart showing states of shifting of electric powers supplied to the loads according to the second embodiment.

FIG. 6 is a timing chart which shows voltage waveforms at several points on the circuit configuration shown in FIG. 5.

The operation will be described with reference to an example in which voltages V1 and V2 for driving the first load L1 and voltages V1 and V3 for driving the second load L2 satisfy a relation such that V1<V3<V2.

The second embodiment supposes one cycle from t31 to t32 shown in the figure as a unit which is divided by time sharing into a total of four phases: a first phase which takes the first load L1 as voltage V1; a second phase which takes the second load L2 as voltage V3; a third phase which takes the first load L1 as voltage V2; and a fourth phase which takes the second load L2 as voltage V1. The first load L1 and the second load L2 are driven repeatedly in the same pattern.

The periods of the respective phases need not be equal to each other as shown in the figure.

As indicated by the waveform of the first DC/DC converter in FIG. 6, the power controller 74A switches constant voltages V1 and V2 to be sequentially output in turn to the first DC/DC converter 72 during one cycle from time t31 to time t33.

More precisely, supposing that the voltage output from the first DC/DC converter 72 shifts from voltage V2 to voltage V1 and that a transition period required to become able to supply stable voltage V1 is expressed as Ts21, the power controller 74A instructs the first DC/DC converter 72 to make the output voltage variable (or switch) from V2 to V1 at an earlier timing by transition period Ts21 than time t31, which is the end of the last cycle.

Thereafter, supposing that the voltage shifts from voltage V1 to voltage V2 and that a transition period required to become able to supply stable voltage V2 is expressed as Ts12, in synchronization with the third phase, the power controller 74A instructs the first DC/DC converter 72 to make the output voltage variable (or switch) from V1 to V2 at an earlier timing by transition period Ts12 than time t33 when the third phase starts.

Further, as indicated by the waveform of the second DC/DC converter in FIG. 4, the power controller 74A controls the second DC/DC converter 73 to switch constant voltages V3 and V1 to be sequentially output in turn in a phase which is delayed by approximately one field from an output pattern of the first DC/DC converter 72, during one frame from time t31 to time t33.

More precisely, supposing that the second DC/DC converter 73 shifts from voltage V1 to voltage V3 and that a transition period required to become able to supply stable voltage V3 is expressed as Ts13, the power controller 74A instructs the second DC/DC converter 73 to make the output voltage variable (or switch) from V1 to V3 at an earlier timing by transition period Ts13 than time t41 when the second phase starts.

Thereafter, supposing that the voltage shifts from voltage V3 to voltage V1 and that a transition period required to become able to supply stable voltage V1 is expressed as Ts31, in synchronization with the fourth phase, the power controller 74A instructs the second DC/DC converter 73 to make the output voltage variable (or switch) from V3 to V1 at an earlier timing by transition period Ts31 than time t42 when the fourth phase starts.

On the other side, the switching controller 74B of the power supply controller 74 continuously switches on switch SW11 in synchronization with the first phase and the third phase, as indicated by the waveform of SW11 in FIG. 6, as well as switch SW22 in synchronization with the second phase and the fourth phase, as indicated by the waveform of SW22 in FIG. 6. In this manner, constant voltage V1 is applied to the first load L1 in the first phase, as well as constant voltage V3 to the second load L2 in the second phase. Constant voltage V2 to the first load L1 in the third phase, as well as constant voltage V1 to the second load L2 in the fourth phase. Accordingly, the first load L1 and the second load L2 can be driven continuously with desired stable electric powers.

Thus, while voltage transition periods of the two DC/DC converters 62 and 63 are controlled so as not to overlap each other, outputs of the converters are switched alternately and supplied to the two loads L1 and L2 to drive. In this manner, a plurality of operating voltages are sequentially switched, and the loads can be sequentially driven in turn continuously without an interval in a stable state.

As described above, each of the first and second embodiments can switch powers of a plurality of constant voltages at a high speed and can supply the power while the number of required DC/DC converters is reduced to two as the least necessary number.

Particularly in the first embodiment, any of three voltages Vr, Vg, and Vb which the DC/DC converters 62 and 63 output is continuously supplied to any of the loads. Therefore, the first embodiment can be achieved by repeatedly performing a pattern of driving in units each including two cycles (two frames). Accordingly, control operations can be simplified.

In each of the first and second embodiments, the power controller 64A (74A) performs control to periodically alternately select and switch the first DC/DC converter 62 (72) and the second DC/DC converter 63 (73) both of which are variable constant-power power supplies. Therefore, the burden on the power controller 64A (74A) is reduced by the periodical drive, and the configuration thereof can be simplified.

Further, in each of the first and second embodiments, the power controller 64A (74A) controls the first DC/DC converter 62 (72) and the second DC/DC converter 63 (73) in common. Therefore, the control system can be downsized.

Though not described in the first and second embodiments, one power supply which is not actually used by the loads among the first DC/DC converter 62 (72) and the second DC/DC converter 63 (73) both being variable constant-power power supplies may be controlled so as to temporarily stop in consideration of a transition period until a supplied power is stabilized at a next startup.

For example, in FIG. 4, the first DC/DC converter 62 can be stopped during a period from t21 to the beginning of Tsrb.

In this manner, wasteful power consumption is suppressed in an apparatus using batteries whose power consumptions are both limited. Accordingly, a power supply can be effectively used.

In addition, the switching controller 64B (74B) controls FET switches SW1B, SW1G, SW1R, SW2B, SW2G, and SW2R (SW11 and SW22) to conduct shifted from one another in consideration of transition periods of powers. In this manner, an operation of switching powers of a plurality of constant voltages at a higher speed can be easily achieved.

Further, the first embodiment has been described in case of driving an LD 18 and LEDs 26 and 27 which are semiconductor light emitting devices as loads. Even when semiconductor light emitting devices switched at high speed of this type are used as loads, a driving state can be maintained stably as a whole continuously without an interval. In this respect, the invention can be used desirably.

Each of the first and second embodiments has been described with reference to a case of a constant-voltage power supply which can vary voltages of electric powers majorly supplied to loads. However, the invention is not limited hitherto but is applicable in a similar manner to a constant-current power supply which controls currents supplied to loads.

That is, the invention is applicable to a constant-power-regulated power supply.

Further, the invention is not limited to the embodiments described above but can be variously modified in practical phases without deviating from the subject manners of the invention.

In addition, functions performed by the embodiments described above may be combined as suitably as possible, and may be performed.

The embodiments described above further include various stages, and various inventions can be derived by appropriate combination of a plurality of disclosed components.

For example, even if several components are removed from all the components disclosed in embodiments, the configuration from which the several components are removed may be extracted as an invention, insofar as effects of the invention are obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply apparatus comprising:
a first variable constant-power power supply that switches and supplies powers of j types (where j is a natural number of two or more);
a second variable constant-power power supply that switches and supplies powers of k types (where k is a natural number of two or more); and
a switching controller that selects and switches on the first and second variable constant-power power supplies, excluding power transition periods thereof, to supply a load with a constant power,
wherein the switching controller switches the first variable constant-power power supply and the second variable constant-power power supply so as to be periodically alternately selected.

2. The power supply apparatus according to claim 1, further comprising a power controller that controls the first variable constant-power power supply and the second variable constant-power power supply respectively at the powers of j types and at the powers of k types such that the power transition periods do not overlap each other.

3. The power supply apparatus according to claim 1, wherein the switching controller controls one of the first and second variable constant-power power supplies which does not supply the load with any power so as to the load to be stopped.

4. The power supply apparatus according to claim 1, wherein the switching controller includes a plurality of switching elements, causes the plurality of switching elements to conduct shifted from one another, and supplies the load with a constant power output from at least one of the first and second variable constant-power power supplies.

5. The power supply apparatus according to claim 1, wherein the power supply apparatus supplies power to a semiconductor light emitting device as the load.

6. A power supply apparatus that supplies powers to first through third loads having respectively different driving powers, comprising:
a first variable constant-power power supply that cyclically switches and outputs a first constant power for the first load, a second constant power for the second load, and a third constant power for the third load through transition periods among the constant powers;
a second variable constant-power power supply that outputs
the third constant power, including the transition period from the first constant power to the second constant power of the first variable constant-power power supply,
the first constant power, including the transition period from the second constant power to the third constant power of the first variable constant-power power supply, and
the second constant power, including the transition period from the third constant power to the first constant power of the first variable constant-power power supply,
with the constant powers cyclically switched through the transition periods among the constant powers; and
a switching controller that switches outputs of the first and second variable constant-power power supplies such that the first load is supplied with the first constant powers which do not include the transition periods, alternately from the first and second variable constant-power power supplies, respectively, the second load is supplied with the second constant powers which do not include the transition periods, alternately from the first and second variable constant-power power supplies, respectively, and the third load is supplied with the third constant powers which do not include the transition periods, alternately from the first and second variable constant-power power supplies, respectively.

7. The power supply apparatus according to claim 6, wherein the switching controller makes any of the first through third constant powers of the first and second variable constant-power power supplies be output continuously without an interval to any of the first through third loads.

8. The power supply apparatus according to claim 6, further comprising a power controller that controls the first and second variable constant-power power supplies respectively at the constant powers of three types such that power transition periods do not overlap each other.

9. The power supply apparatus according to claim 6, wherein the switching controller controls one of the first and second variable constant-power power supplies which does not supply the load with any power so as to be stopped.

10. The power supply apparatus according to claim 6, wherein the switching controller includes six switching elements, causes the six switching elements to electrically conduct shifted from one another, and supplies the loads with a constant power output from at least one of the first and second variable constant-power power supplies.

11. The power supply apparatus according to claim 6, wherein the power supply apparatus supplies a power to semiconductor light emitting devices as the first through third loads.

12. An electronic apparatus comprising:
a power supply unit including:
  a first variable constant-power power supply that switches and supplies powers of j types (where j is a natural number of two or more),
  a second variable constant-power power supply that switches and supplies powers of k types (where k is a natural number of two or more), and
  a switching controller that selects and switches the first and second variable constant-power power supplies, respectively excluding power transition periods thereof, to supply a constant power; and
a load that operates by powers supplied from the power supply unit,
wherein the switching controller switches the first variable constant-power power supply and the second variable constant-power power supply so as to be periodically alternately selected.

13. An electronic apparatus with a power supply unit that supplies powers to a first through third loads having respectively different driving powers, the power supply unit comprising:
a first variable constant-power power supply that cyclically switches and outputs a first constant power for the first load, a second constant power for the second load, and a third constant power for the third load through transition periods among the constant powers;
a second variable constant-power power supply that outputs the third constant power, including the transition period from the first constant power to the second constant power of the first variable constant-power power supply, the first constant power, including the transition period from the second constant power to the third constant power of the first variable constant-power power supply, and the second constant power, including the transition period from the third constant power to the first constant power of the first variable constant-power power supply, with the constant powers cyclically switched through the transition periods among the constant powers; and a switching controller that switches outputs of the first and second variable constant-power power supplies such that the first load is supplied with the first constant powers which do not include the transition periods, alternately from the first and second variable constant-power power supplies, respectively, the second load is supplied with the second constant powers which do not include the transition periods, alternately from the first and second variable constant-power power supplies, respectively, and the third load is supplied with the third constant powers which do not include the transition periods, alternately from the first and second variable constant-power power supplies, respectively.

14. A power supply method comprising:
allowing a first variable constant-power power supply to switch and supply powers of j types (where j is a natural number of two or more);
allowing a second variable constant-power power supply to switch and supply powers of k types (where k is a natural number of two or more); and
selecting and switching on the first and second variable constant-power power supplies, excluding power transition periods thereof, to supply a load with a constant power,
wherein the selecting and switching includes switching the first variable constant-power power supply and the second variable constant-power power supply so as to be periodically alternately selected.

15. A power supply control method for an apparatus with a power supply unit that supplies powers to first through third loads having respectively different driving powers, the method comprising:
allowing a first variable constant-power power supply to cyclically switch and output a first constant power for the first load, a second constant power for the second load, and a third constant power for the third load through transition periods among the constant powers;
allowing a second variable constant-power power supply to output the third constant power, including the transition period from the first constant power to the second constant power of the first variable constant-power power supply, the first constant power, including the transition period from the second constant power to the third constant power of the first variable constant-power power supply, and the second constant power, including the transition period from the third constant power to the first constant power of the first variable constant-power power supply, with the constant powers cyclically switched through the transition periods among the constant powers; and switching outputs of the first and second variable constant-power power supplies such that
- the first load is supplied with the first constant powers which do not include the transition periods, alternately from the first and second variable constant-power power supplies, respectively,
- the second load is supplied with the second constant powers which do not include the transition periods, alternately from the first and second variable constant-power power supplies, respectively, and
- the third load is supplied with the third constant powers which do not include the transition periods, alternately from the first and second variable constant-power power supplies, respectively.

* * * * *